(12) United States Patent
Rehmanji et al.

(10) Patent No.: US 10,308,905 B2
(45) Date of Patent: Jun. 4, 2019

(54) METHOD OF REMOVING PHENOLS FROM A LIQUID

(71) Applicant: ISP INVESTMENTS INC., Wilmington, DE (US)

(72) Inventors: Mustafa Rehmanji, Riverdale, NJ (US); Andrew Mola, Highland Lakes, NJ (US); Joseph P. Bartko, Nazareth, PA (US)

(73) Assignee: ISP INVESTMENTS LLC, Wilmington, DE (US)

(*) Notice: Subject to any disclaimer, the term of this patent is extended or adjusted under 35 U.S.C. 154(b) by 418 days.

(21) Appl. No.: 14/898,621

(22) PCT Filed: Jun. 12, 2014

(86) PCT No.: PCT/US2014/042109
§ 371 (c)(1),
(2) Date: Dec. 15, 2015

(87) PCT Pub. No.: WO2014/204776
PCT Pub. Date: Dec. 24, 2014

(65) Prior Publication Data
US 2016/0137960 A1    May 19, 2016

Related U.S. Application Data

(60) Provisional application No. 61/836,919, filed on Jun. 19, 2013.

(51) Int. Cl.
*C12H 1/056* (2006.01)
*C08L 39/06* (2006.01)

(52) U.S. Cl.
CPC ............ *C12H 1/0424* (2013.01); *C08L 39/06* (2013.01)

(58) Field of Classification Search
CPC .................. C12H 1/0424; C08L 39/06
See application file for complete search history.

(56) References Cited

U.S. PATENT DOCUMENTS

| | | |
|---|---|---|
| 4,910,182 A | 3/1990 | Hums |
| 2007/0166438 A1 | 7/2007 | Kitahata et al. |
| 2009/0214701 A1 | 8/2009 | Forchhammer et al. |
| 2011/0195263 A1 | 8/2011 | Maltoky et al. |
| 2013/0064938 A1 | 3/2013 | O'Brien et al. |

OTHER PUBLICATIONS

International Search Report, PCT/US2014/042109 dated Nov. 12, 2014.

*Primary Examiner* — Michael C Miggins
(74) *Attorney, Agent, or Firm* — William J. Davis; Shaorong Chen; Nathalie Tietcheu

(57) ABSTRACT

A method of removing a phenol contaminant from a beer or wine comprising contacting the beer or wine with a surface comprising a phenol contaminant effective removing amount of a poly(N-vinyl-2-pyrrolidone).

15 Claims, 4 Drawing Sheets time (hours)

METHOD OF REMOVING PHENOLS FROM A LIQUID

FIELD

The present disclosure relates to a method of removing phenols from a liquid, for example, a beer or wine.

BACKGROUND

A longstanding problem in the beer and wine production industries is the removal of haze-forming contaminants and astringent taste contaminants. The following references provide evidence and potential solutions to this problem: U.S. Pat. Nos. 2,316,241; 3,117,004; 3,163,538; 3,413,120; 3,512,987; 3,554,759; 3,617,301; 3,818,111; 3,903,316; 4,166,141; 4,820,420; 4,910,182; and by the following, foreign patents and technical publications: (1) Gorinstein, S et al, J of Food Biochemistry 14, 161 172 (1990). (2) Boschet, G. Brauindustrie 70 (16) 1441 4 (1985). (3) McMurrough, I. et al J. Am. Soc. Brewing Chemists 50 (2) 67 76 (1992). (4) GB 1,151,476 ('69) Deutsche Gold (silica+ PVP). (5) Weyh, H. Inst. Chem. Tech. Anal. Chem. 8050 (1987). (6) Boschet, G. Bios (Nancy) 17 (8 9) 49 52 (1986). (7) Birkner, F. EPA 183162 A2 Jun. 4, 1986 EP 85114640 (Nov. 18, 1985). (8) Hums, N. DE 3509892A1 Sep. 25, 1986. (9) Buchvarov, V. Monatsschr. Brauwiss 39 (5) 188 92 (1986) (10) Wackerbauer, K. Monatsschr. Brauwiss 37 (5) 201 7 (1984). (11) Chi, C. W. DE 3302258A1 Jan. 25, 1983. (12) Jaeger, P. Mitt. Versuchsstn Gaerungsgewerke Wien 34 (9 10) 83 9 (1980). (13) Sfat, M. R. Tech. Q, Master Brew Assn Am 12 (4) 243 8 (1975) (14) Silbereisen, K. Monatsschr. Brauwiss 21 (8) 221 35 (1968). (15) Schafft, H. Brauwelt 117 (36) 3 7 (1977). (16) Blecher, L. Brew. Dig, 51 (7) 33 5, 44 (1976). (17) Grace, DE 3302258A1 (1983). (18) Chi, C. W. Can. Pat. 1,178,222. (19) Suhner, Ger. Pat. Publicn. 1907610, C.A. 75, October 1972 (p. 2/6) QD 1A5.

SUMMARY

In an embodiment, a method of removing a phenol contaminant from a liquid, e.g., a beer or a wine may include contacting the beer or wine with a surface comprising a phenol contaminant removing effective amount of a poly (N-vinyl-2-pyrrolidone).

In an embodiment, a composition may include poly(N-vinyl-2-pyrrolidone) in a water-insoluble matrix.

In another embodiment, a composition may include a base polymer and poly(N-vinyl-2-pyrrolidone).

In another embodiment, a composition may include aluminum and poly(N-vinyl-2-pyrrolidone).

In another embodiment, a polyester container may include a poly(N-vinyl-2-pyrrolidone) having a catechin reducing capacity to reduce from about 30% to about 80% of catechin in an 80-ppm aqueous solution of catechin after 2 weeks of storage at refrigerated temperature, e.g., about 2 to 10° C.

Other objects and advantages of the disclosed method will be apparent from the following description, the accompanying drawings and the appended claims.

DETAILED DISCLOSURE

In an embodiment of the present disclosure, the surface in contact with the liquid may be a potably acceptable surface. A potably acceptable surface may be a surface that contacts the liquid and is afterward acceptable for consumption of the liquid by a human or animal. Such surfaces have substantially little to no toxicological effect, e.g., as measured over a population of humans or animals; or e.g., as measured by an acceptable statistical methodology, on the potability, the taste, toxicity, or the acceptability of the beverage to a group of humans or animals. Such methods of measure measurement may be generally known to a person of ordinary skill in the art. A surface may include a material selected from the group consisting of a metal, a metal alloy, a glass, aluminum, an aluminum alloy, a steel, a plastics, and a combination thereof.

Figure 1:
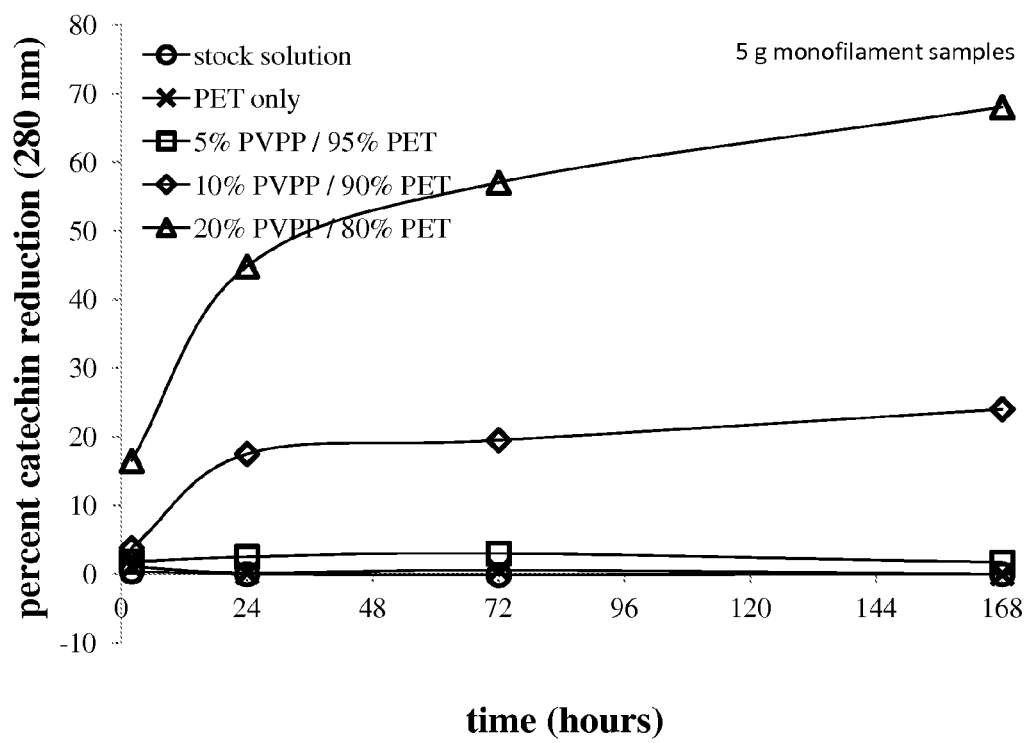
FIG. 1 illustrates percent catechin reduction over time for a co-extrudated monofilament.

In an embodiment, the phenol contaminant may contain a phenol monomer (e.g. a phenol molecule or a salt thereof, or a complex thereof) or a phenol polymer (e.g., a polymer comprising a phenol monomer; or a copolymer comprising two or more phenol monomers; and/or monomer and/or the monomers may comprise a salt thereof or a complex thereof). In an embodiment, the phenol contaminant may be a flavonol or flavinoid (e.g., catechin or gallochatechin), a condensed flavinol (e.g., a proanthocyanidin such as prodelphinidin), and/or a tannoid resulting from radical polymerization of a one or more flavinol monomers (e.g., a polymer of repeating gallochatechin monomeric units). Such tannoids may be known to a person of ordinary skill in the art and may generally have the structures as shown in FIG. 1. In an embodiment, there may be from 2 to 10000 mers in the polymer.

In an embodiment, one or more of the proanthocyanidins described in *Beer in Health and Disease Prevention*, Chapter 32, *Proanthocyanidins in Hops*, Li, Hui-Jing et al. (Elsevier, 2009), the entire contents of which are encorporated by reference herein and relied upon, may be a flavanol or flavonoid according to the disclosure.

In an embodiment, the liquid may be a beverage, e.g., a beer, a wine, a stabilized beer, a tea beverage, e.g., a green tea, a black tea, an herbal tea; a coffee beverage; a fruit juice; or a vegetable juice.

The term poly(N-vinyl-2-pyrrolidone) may also be understood by the term PVPP in the present specification and claims. PVPP is described in U.S. Pat. No. 7,153,534, incorporated herein its entirety by reference and relied upon. PVPP may also be known by the common names crospovidone or polyvidone.

PVPP may in an embodiment mean cross-linked polyvinylpyrrolidone, such as Polyclar® PC-10, available from Ashland, Inc. PVPP may be used in the disclosure in any number of molecular weight ranges, e.g., from 1000 to 2,500,000 Daltons, or, e.g., from 200,000 to 800,000 Daltons; or e.g., from 300,000 to 500,000 Daltons; or from 500,000 to 2,500,000 Daltons.

In an alternative embodiment, PVP (CAS No. 9003-39-8) may be used with or in place of PVPP. PVP may be known by the names povidone or copovidone. PVP may be typically have a molecular weight range of from about 2500 to about below 100,000 Daltons. PVP is generally available in K values, e.g., K 17, K 30, K 80, K 85, K 90, and/or K 90 HM.

In an embodiment, PVPP is generally available in average particle size ranges of about 11 μm, or about 23 μm, or about 111 μm. These PVPP particle sizes may be available from Ashland, Inc., of Wayne, N.J., USA, per the figures and product sheets that are part of this disclosure; or; in an alternative embodiment, from BASF.

In an embodiment, PVPP may be from about 1% to about 99% of the material, or from about 2% to about 90%, or from about 3% to about 80%, or from about 5% to about 70% or from about 10% to about 70%, or from about 20% to about 60%, or from about 20% to about 50%, or from about 20% to about 40%, or from about 20% to about 30% of PVPP by weight.

In an embodiment, the base polymer may be selected from the group consisting of poly(ethylene terephthalate) (PET), high density polyethylene, (HDPE), low density polyethylene (LDPE), polypropylene, polystyrene, polycarbonate, styrene-butadiene copolymers, poly(ethylene 2,6-naphthalene-2,6-dicarboxylate), and a combinations thereof. Such base polymers are known to the person of ordinary skill in the art.

In an embodiment, the PVPP may be dispersed in a matrix, e.g. a material, e.g., the base polymer. The dispersion may be a homogeneous dispersion, colloidal dispersion, coarse dispersion, or a combination thereof.

In an embodiment, the PVPP may be dispersed in a resin, glass, or combination thereof. A resin may be resin a phenolic resin, epoxy resin, acrylic resin, polyester resin, amino resin, melamine resin, urea resin, benzoguanamine resin, or a combination thereof. The resin may also contain additives such as bisphenol A.

The material may be an extruded material, e.g., wherein the base polymer and the PVPP are admixed in a heated screw extruder, melted, and provided as an extrudate, e.g., a bead, filament, film, sheet, tube, bottle preform, and/or bottle. The extrudate may be extruded into a form to provide a shaped article.

In an embodiment, the PVPP may be dispersed in a coating that adheres to the interior of an article, e.g., a container. Although the following characteristics of an article of this disclosure are described primarily with reference to a thin-walled, cylindrical container, containers of various other shapes and sizes and wall construction; e.g., a composite wall of thin aluminum or steel foil and paper plies may be an embodiment of the present disclosure.

The coating adhering to the interior surfaces of the container may be either a thermoset or thermoplastic resinous coating with a higher density and lower porosity than a film of similar chemical composition applied from a solvent system. The coating may contain little to no free organic materials of low molecular weight, particularly liquid organic solvent materials, and may have improved adhesion in comparison with films of similar chemical composition applied from a solvent system. Low molecular weight ingredients, such as solvents, monomers and dimers may have a molecular weight generally of less than 150. The film may be less than one mil in thickness and frequently less than 0.5 mils.

The film may be uniform in thickness and because no solvent evaporates from the film, the film may be blister free. The film may be substantially cured, in the case of thermoset resins, and substantially cooled, in the case of thermoplastic resins, shortly after application so that the coated part may be handled and subjected to further fabrication without damage to the film.

Particular thermoplastics, which are useful in providing thin, uniform coatings include thermoplastic epoxide and phenoxide resins having molecular weights of about 20,000 to about 200,000 such as polypropylene, nylon and polyethylene.

Containers having on their interior thin, adherent films of nylon, polybutylene, ethylene-maleic acid copolymers, or polypropylene which are solvent-free, blister-free and possess a thin, uniform thickness may be an embodiment of the disclosure. In an embodiment, the film may not add flavor to the liquid contacting it, e.g., beer.

Nylon may be added to the base polymer or the material of the disclosure, e.g., a polymer or a resin. Thermoset resinous coatings applied to interior container surfaces include thermoset epoxy resins. Epoxy resins are particularly useful coatings for food and beverage containers.

In an embodiment, the internal wall surfaces of the container may be coated with an insoluble, polymeric organic coating material having a high concentration e.g. at least about 75% by weight of a hydrophilic monomer component such as acrylic acid. Alternatively a hydrophilic monomer, e.g., PVPP, can be graft polymerized onto the surface of a non-hydrophilic or hydrophobic coating affixed to the container wall surface whereby substantially the entire exposed surface of the hydrophobic material is rendered hydrophilic.

Examples of insoluble polymeric coating materials which can be used in the practice of the present disclosure include polymers or copolymers of alpha, beta ethylenically unsaturated hydrophilic monomers wherein the polymer or copolymer is comprised of at least about 75% by weight of the hydrophilic monomer. Hydrophilic monomers within the meaning of the present disclosure include carboxyl containing monomers such as alpha, beta ethylenically unsaturated carboxylic acids having 2 to 8 carbon atoms such as acrylic acid, methacrylic acid and itaconic acid, anhydride containing monomers such as maleic anhydride and itaconic acid anhydride, amide containing monomers such as acrylamide, methacrylamide, hydroxyl containing monomers such as hydroxyalkyl acrylates such as hydroxy ethyl acrylate, hydroxypropyl acrylate, or monomers containing a pyrrolidone group such as an N-vinyl pyrrolidone.

Monomers which may be copolymerized with the hydrophilic monomers enumerated above include alkyl esters of an alpha, beta-ethylenically unsaturated carboxylic acid, such as an alkyl acrylate or an alkyl methacrylate, or which may be a vinyl aromatic hydrocarbon. Alkyl acrylates and methacrylates which may be utilized to prepare the copolymeric coating compositions include the ethyl, methyl, propyl, butyl, hexyl, ethyl-hexyl, and lauryl acrylates and methacrylates as well as similar esters having up to about 20 carbon atoms in the alkyl group. The vinyl aromatic hydrocarbon, if one is employed, is usually styrene, an alpha-alkyl styrene, or vinyl toluene. Preferably, these copolymer coating compositions contain about 75 to about 95% by weight of the hydrophilic chemical group containing monomer, about 5 to about 25% by weight of the alkyl acrylate and 0 to 25% by weight of the vinyl aromatic hydrocarbon.

The copolymers may be produced from the above monomers using conditions and catalysts conventionally employed in preparing acrylate and methacrylate polymers. Thus, for example, the catalyst is ordinarily a free radical catalyst, such as cumene hydroperoxide, benzoyl peroxide, ammonium persulfate, azo-bis-isobutyronitrile or the like, and the polymerization temperature is commonly between about 65° C. and 140° C. The solvents used in making these copolymers include aliphatic hydrocarbons, alcohols, esters, ketones and similar materials.

Polymers prepared using hydrophilic monomer concentrations of 75% by weight or more may become water soluble. Water soluble polymers having a high degree of hydrophilicity are also useful in the practice of the disclosure. Examples of these polymers include poly (vinyl alcohol), etherified starches, etherified cellulosics and sulfonated polystyrenes. As the polymeric materials of the present disclosure be water insoluble in order to be operable for use in surface contact with liquids, e.g., beer, or a carbonated beverage, after application to the container surface of the water soluble polymeric material, the polymer may be cross-linked sufficiently to insolubilize the polymer. It may be within the skill of the art to select the proper cross-linking agents to effect the insolubilization of the polymeric materials. For example, polyacrylamide, which may be water soluble, may be insolubilized by cross-linking the polymer with a urea-formaldehyde resin. Poly(vinyl alcohol) may be insolubilized by cross-linking with aldehydes such as formaldehyde or glyoxal. Other useful cross-linking agents include polyepoxides such as butadiene diepoxide, polyamide epichlorohydrin resin and acyl halides such as adipoyl chloride, sebacoyl chloride. In applying the cross-linking agents to insolubilize the polymer, the less reactive agents are added in admixture with the coating solution containing the polymer. In the case of more reactive cross-linking agents, the polymers are applied to the container internal wall surface and subsequently treated with the cross-linking agent in a separate treating step.

In cross-linking the water soluble polymer it is critical that the polymer be sufficiently cross-linked to render it insoluble but not to the extent that the polymer loses its affinity for water. Generally this can be accomplished by cross-linking about 5-20% of the functional groups on the polymer backbone. To effect cross-linking the water soluble polymer and the cross-linking agent are heated at 200-425° F. for a time sufficient e.g. 10 to 30 minutes to effect insolubilization of the polymer.

The hydrophilic coating compositions can be applied to the internal walls of beverage containers by various methods, such as dipping, spraying, roll coating, coil coating or brushing. The method of application usually determines the choice of solvents. For example, more volatile solvents, such as methyl ethyl ketone, are included in compositions to be sprayed, whereas butyl cellosolve or other higher boiling solvents are included in compositions to be roll coated.

The coating compositions are applied at a solids concentration of about 5 to about 50% by weight in thicknesses as low as 1 to 5 milligrams per square inch, and preferably 3 to 7 milligrams per square inch.

After application, the coatings may be cured by heating at elevated temperatures. A convenient curing schedule may be 5 to 10 minutes at 325° F., with higher temperatures requiring shorter times and lower temperatures longer times, particularly when a cross-linking reaction is involved.

The internal surface of the container may also be rendered hydrophilic in accordance with the practice of the present disclosure wherein an ethylenically unsaturated monomer containing a hydrophilic chemical group, e.g., N-vinylpyrrolidinone, is graft copolymerized and incorporated onto the backbone of a hydrophobic polymeric substrate. Such graft copolymers are advantageously applied to container wall surfaces by preparing mixtures comprising a solution or dispersion of the monomer and a polymerization catalyst and then applying the mixture to the hydrophobic polymer surface, e.g., a previously coated container internal wall surface, in the same manner as the hydrophobic polymer coating is originally applied to the container wall, i.e., by dipping or spraying, to bring the monomer into contact with the hydrophobic substrate. After application of the monomer mixture, the monomer wetted hydrophobic polymer substrate is exposed to polymerization actuating means such as source of ultraviolet radiation, ionizing radiation or catalytic agents such as those used in peroxide initiated polymerization reactions previously mentioned for acrylate polymers which are incorporated in the monomer mixture whereby the monomer is graft polymerized onto the hydrophobic polymer surface.

If the hydrophilic monomers are grafted onto the hydrophobic surface using ultraviolet radiation as the polymerization initiator, the presence in the monomer mixture of photosensitizers such as benzophenone, 4,4-dimethyl benzophenone, chlorothioxanthone and benzoin at concentrations of 0.001 to 0.1% by weight is desirable.

After the graft polymerization reaction is completed, the graft polymerized surface is washed to remove ungrafted or unreacted monomer and is then dried.

In graft polymerizing the hydrophilic monomer onto the hydrophobic surface it advantageous that at least 0.1 milligram (mg.) of monomer be grafted per square inch of container wall surface and preferably about 0.75 to about 2 $mg/in^2$ of container wall surface.

In an embodiment, a device e.g., a widget, comprising a material of the disclosure may be used to float or be contacted with a liquid to remove the phenol contaminant. The device may be of any convenient shape, e.g., a filter mat, web, film, sphere, and sheet, a container insert, or a blown film. The widget or device may be removably or permanently mounted on an internal liquid container wall or internal surface. In an embodiment, the amount of PVPP active sites on the device or widget in contact with a volume of liquid may be selected to reduce and/or maintain the amount of phenol contaminant in the volume over time. For example, in stabilized beer, the device may be inserted into a keg beer with the assumption that the volume contains about 140-150 mg/L of total polyphenols. The device may be selected to e.g., remove from 50-90% of the phenols over 2 months, or may be selected to remove from about 10-50% over 2 months. In a selection, the device may be manufactured and designed to maintain the beer at a certain taste level, e.g., astringency, bitterness, or provide another organoleptic property desired by the consumer and/or brewer.

In an embodiment, the amount of PVPP in or on the surface of the device may be varied with the liquid-contacting surface area of the device to control the amount and/or rate of removal of the phenol contaminant.

In an embodiment, a beverage package comprising a sealed, non-resealable, container having a primary chamber containing beverage having gas in solution therewith and forming a primary headspace comprising gas at a pressure greater than atmospheric; enclosure means defining a secondary chamber, which enclosure means comprises a base polymer and a phenol contaminant removing amount of poly(N-vinyl-2-pyrrolidone), the secondary chamber having a volume less than said primary chamber; restrictor means defining a restricted orifice, said secondary chamber communicating with the beverage in said primary chamber through said restricted orifice; said secondary chamber containing beverage supplied thereto from the beverage in the primary chamber and having a secondary headspace therein comprising gas at a pressure greater than atmospheric so that the pressures within the primary and secondary chambers are substantially at equilibrium; said container is openable to expose the primary headspace to atmospheric pressure, and wherein the secondary chamber is arranged so that upon opening of the container the pressure differential caused by the decrease in pressure at the primary headspace causes beverage in the secondary chamber to be ejected by way of the restricted orifice into the beverage of the primary chamber and said ejection causes gas in the solution to be evolved and form, or assist in the formation of, a head of froth on the beverage.

In an embodiment the enclosure means is of any convenient shape, e.g., spheroidal. The enclosure means may be a device, e.g., a widget; and the restricted orifice in the enclosure means may be formed by a orifice forming means, e.g., laser boring, drilling and punching.

In an embodiment an article may be a preform, bottle, can, keg, tank, vat, bag, pouch, cork, cooler, cup, container, carton, carafe, spout, jug, cap, lid, insert, strainer, tray, pipe, tube, web, widget, filter, or other shaped article.

The following examples illustrate the embodiments of the disclosure.

Examples 1-3: Production of PVPP/PET Composites

Several different types of plastic compositions were produced containing varying ratios of PVPP and bottle-grade PET in different product formats. The product formats included pelletized concentrate, monofilament extruded composites, flat-sheet and flat film extruded composites, and hollow-tube extruded composites.

Both PVPP and PET were pre-dried at about 103° C. for a minimum of 24 hours, which facilitated low residual moisture content and molten polymer viscosity. For single-screw extruder used in the experiments, the PET, which can be purchased in pellet form, was ground into a powder. This step assured product homogeneity. However, the extrusion systems equipped with calibrated additive feeders typically do not need a pre-grinding step. Also, for those systems where additives can be fed downstream of the feed input, grinding of the PET also may not necessarily be required. Cooling of the resulting product was accomplished in an air controlled system. Samples were then submitted for testing of adsorption of polyphenols.

After pre-drying the materials, they were premixed and introduced into a 25-mm, single-screw extruder, and then fed through several different die configurations: a strand die (e.g., for fiber and monofilaments), round and hollow dies (e.g., for hollow tubing including pipe tubing and bottles), and flat sheet dies (e.g., casting film and sheet grade products). Temperatures generally were maintained around 265° C., but adjusted to control stability and melt temperature as required. Screw speeds were adjusted as needed to control the output rate as suited for the particular die configuration, as well as for insuring stability and controlling the final gauge desired. A high-efficiency, mixing screw was employed.

In Example 1 the monofilaments were produced at PVPP/PET mass ratios of 5/95, 10/90, and 20/80.

In Example 2 the flat-sheet extruded compositions were produced at PVPP/PET mass ratio of 20/80.

In Example 3 the hollow-tube extruded composites were essentially flat sheets. The disclosure is not limited to hollow tubes, as bottles of varying shapes, wall thicknesses, and sizes also can be made.

Containers may be monolayer, or multilayer, as needed for the performance of the container.

This process is not limited to single-screw extrusion, as twin-screw configurations also were found to be suitable for making the composites.

In addition to producing PVPP/PET composites, this process also may be used to make PVPP composites with other extrudable plastics, such as olefins.

Examples 4-6: Catechin Absorption

A standard stock solution containing 80 ppm catechin (Sigma-Aldrich) in deionized water was prepared using a magnetic stir bar for 15 minutes. After solution preparation, 100 mL of the stock solution was added to a beaker containing a PET-only planchet (control) and PVPP/PET composite monofilaments (Example 5), flat sheets (Example 6), and hollow tubes (Example 7). Catechin absorption was monitored by UV adsorption at 280 nm as a function of contact time. Also, adsorption of catechin was measured as a function of different surface area of PET/PVPP co-extruded plastic.

The results of Example 4 with monofilament co-extruded samples illustrate that increasing contact time enhanced catechin reduction, particularly for co-extrudates having more than 5% PVPP (FIG. 1).

Figure 2:
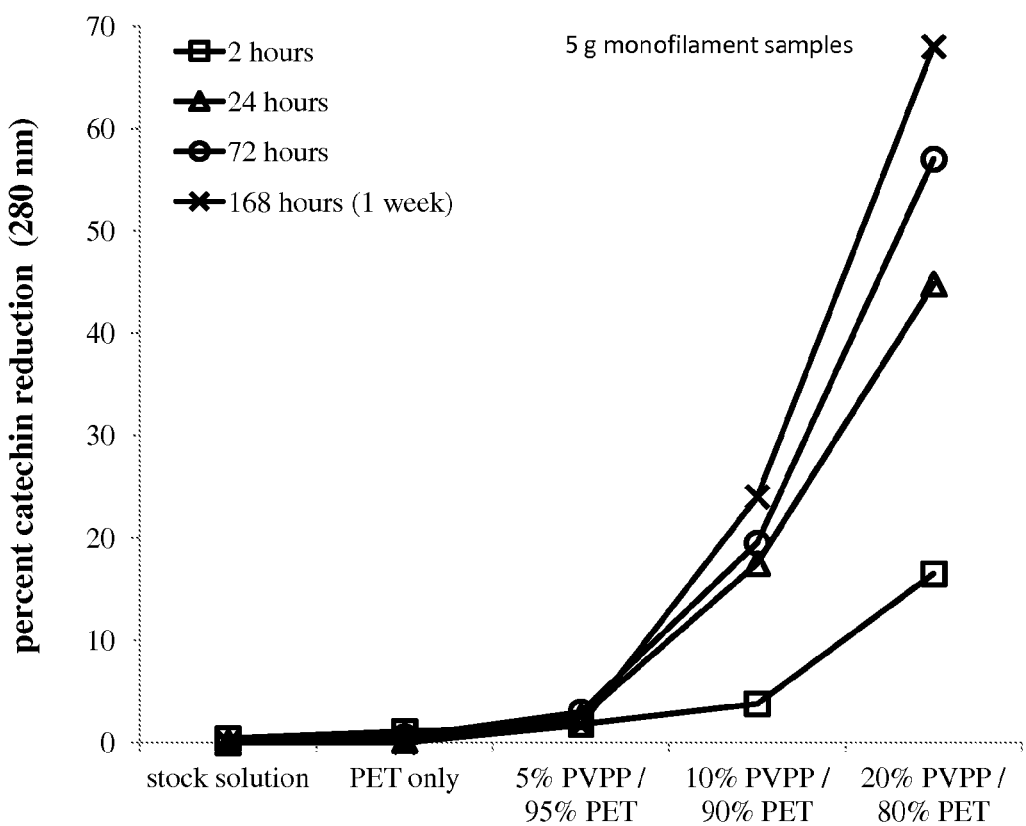
FIG. 2 illustrates increasing the PVPP content of the extrudate increased catechin reduction.

Increasing the PVPP content of the extrudate also increased catechin absorption (FIG. 2). This second graph confirms catechin absorption is essentially constant and nil using the PET-only control.

Figure 3:
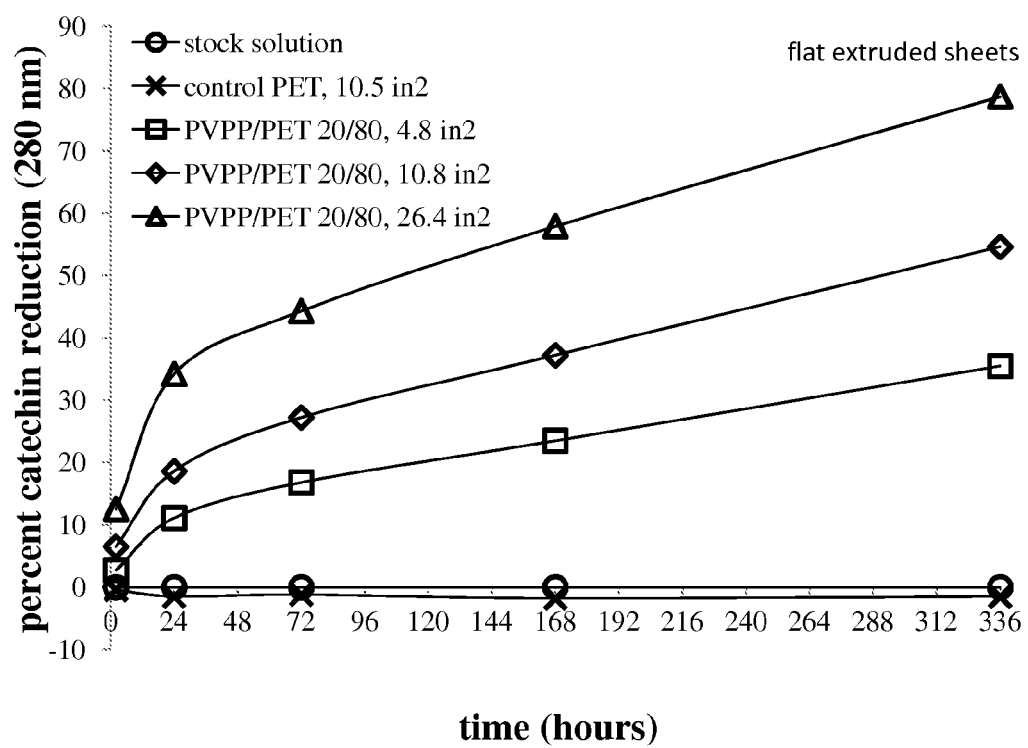
FIG. 3 illustrates percent catechin reduction over time for a co-extrudated flat sheet.

The flat sheets studied in Example 5 were made using co-extrudate containing 20% PVPP, 80% PET (weight ratio). In general, solutions tested with the PVPP/PET materials continued to remove catechin with time, whereas the control catechin solution and the PET-only control were essentially constant and provided no catechin removal (FIG. 3). A co-extrudate flat sheet having a surface area of 26.4 in$^2$ removed 78% of the catechin from the 100 mL solution after 2 weeks.

Figure 4:
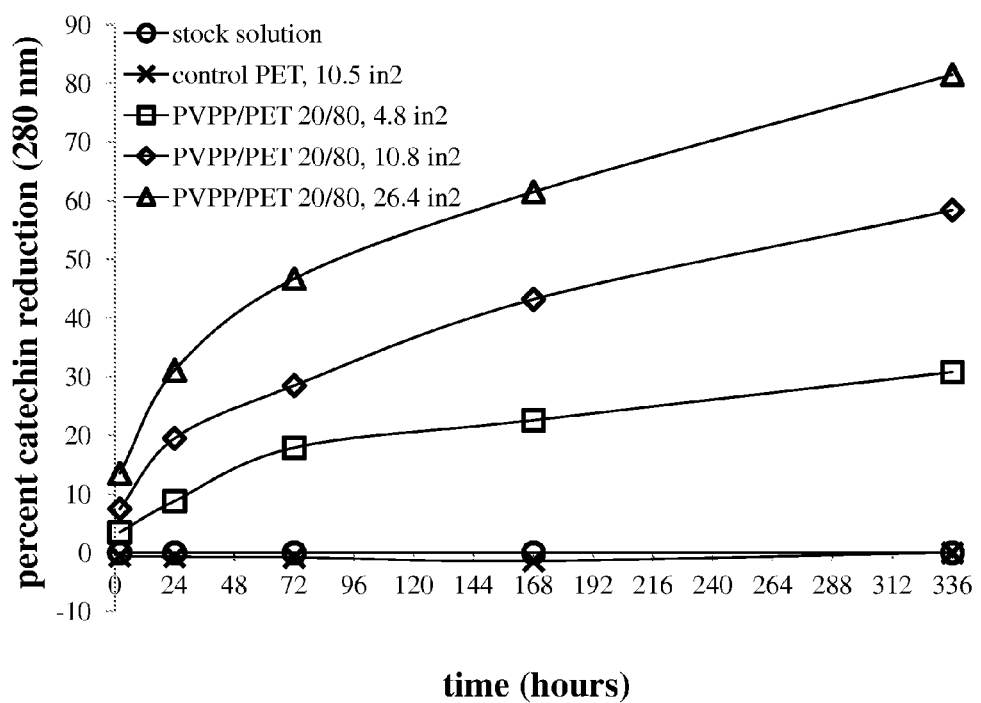
FIG. 4 illustrates percent catechin reduction over time for an extended hallow tube

Similar results were obtained in Example 6 (FIG. 4) with extruded hollow tube made with 20% PVPP, 80% PET (weight ratio).

What we claim is:

1. A method of removing a phenol contaminant from a beer or wine comprising contacting the beer or wine with a beverage container having a potably acceptable surface comprising a composite of a cross-linked polyvinylpyrrolidone (PVPP) and a matrix.

2. The method according to claim 1 wherein the composite comprises about 1% to about 99% of cross-linked polyvinylpyrrolidone (PVPP) by weight of the total composite composition.

3. The method according to claim 1 wherein the surface comprises a material selected from the group consisting of a metal, a metal alloy, a glass, aluminum, an aluminum alloy, a steel, a plastic, and a combination thereof.

4. The method according to claim 3 wherein the aluminum is coated with the composite of cross-linked polyvinylpyrrolidone (PVPP) and a matrix.

5. The method according to claim 3 wherein the glass is coated with the composite of cross-linked polyvinylpyrrolidone (PVPP) and a matrix.

6. A method of preparing the composite of claim 5 comprising mixing the matrix and the PVPP (cross-linked polyvinylpyrrolidone) above the glass transition temperature of the matrix and/or the PVPP.

7. The method according to claim 6 wherein the mixing is in a screw extruder.

8. The method according to claim 6 wherein the process further comprises an injection molding or blow molding process.

9. The method according to claim 3 wherein the surface is a monolayer or multilayer.

10. The method according to claim 1 wherein the phenol contaminant is selected from the group consisting of a phenol monomer and a phenol polymer.

11. The method according to claim 10 wherein the phenol polymer comprises from 2 to 10000 monomeric units.

12. The method according to claim 1 wherein the matrix is selected from the group consisting of a base polymer, a glass, a plastic, a resin and a combination thereof.

13. The method according to claim 12 wherein the base polymer is selected from the group consisting of poly(ethylene terephthalate) (PET), high density polyethylene, (HDPE), low density polyethylene (LDPE), polypropylene, polystyrene, polycarbonate, styrene-butadiene copolymers, poly(ethylene 2,6-naphthalene-2,6-dicarboxylate), and a combinations thereof.

14. The method according to claim 12, wherein the resin is selected from the group consisting of epoxy, acrylic and its copolymer, nylon, polybutylene, ethylene-maleic acid copolymer, and polypropylene.

15. The method according to claim 14 wherein the epoxy resin is epoxy resin comprising a bisphenol.

\* \* \* \* \*